(12) United States Patent
Johnston et al.

(10) Patent No.: US 10,496,554 B2
(45) Date of Patent: Dec. 3, 2019

(54) SYSTEM ON CHIP AND METHOD OF EXECUTING A PROCESS IN A SYSTEM ON CHIP

(71) Applicants: Michael Johnston, Paisley (GB); Alan Devine, Paisley (GB); Alistair Paul Robertson, Glasgow (GB); Manfred Thanner, Neubiberg (DE)

(72) Inventors: Michael Johnston, Paisley (GB); Alan Devine, Paisley (GB); Alistair Paul Robertson, Glasgow (GB); Manfred Thanner, Neubiberg (DE)

(73) Assignee: NXP USA, INC., Austin, TX (US)

( * ) Notice: Subject to any disclaimer, the term of this patent is extended or adjusted under 35 U.S.C. 154(b) by 319 days.

(21) Appl. No.: 14/194,862

(22) Filed: Mar. 3, 2014

(65) Prior Publication Data
US 2015/0248358 A1 Sep. 3, 2015

(51) Int. Cl.
*G06F 12/00* (2006.01)
*G06F 12/14* (2006.01)
(Continued)

(52) U.S. Cl.
CPC ...... *G06F 12/1475* (2013.01); *G06F 12/0284* (2013.01); *G06F 21/00* (2013.01);
(Continued)

(58) Field of Classification Search
CPC ............. G06F 12/1475; G06F 15/7807; G06F 12/1425; G06F 12/1433; G06F 21/70;
(Continued)

(56) References Cited

U.S. PATENT DOCUMENTS 8,881,251 B1 * 11/2014 Hilger ................... H04L 63/083
713/183
9,965,626 B2 * 5/2018 Margalit ................. G06F 21/79
(Continued)

FOREIGN PATENT DOCUMENTS

EP 1657925 A1 5/2006

OTHER PUBLICATIONS

Vinod Yalburgi, How to Restore a Locked and Disabled Iphone or iPad; Jan. 13 2013; International Business Times.*
(Continued)

*Primary Examiner* — Gurtej Bansal

(57) ABSTRACT

A system on chip, comprising a processing unit for executing processes, a memory unit, and a memory control unit connected between the processing unit and the memory unit, is described. The memory control unit allocates a memory region to a process. The memory control unit comprises a process activity counter which counts a duration of the process or transactions by the process to or from the memory region and which maintains a process activity count representing the counted duration of the process or the counted transactions to or from the memory region. The memory control unit disables the memory region in response to the process activity count exceeding a maximum process activity count. Notably, it blocks the memory region against further transactions by the process and against transactions by any other processes.
A method of operating a system on chip is also described.

19 Claims, 2 Drawing Sheets

(51) Int. Cl.
*G06F 12/02* (2006.01)
*G06F 21/00* (2013.01)
*G06F 15/78* (2006.01)

(52) U.S. Cl.
CPC ...... *G06F 12/1441* (2013.01); *G06F 15/7807* (2013.01); *G06F 2212/1052* (2013.01)

(58) Field of Classification Search
CPC ...... G06F 21/74; G06F 21/78; G06F 12/0284; G06F 21/00; G06F 12/1441
See application file for complete search history.

(56) References Cited

U.S. PATENT DOCUMENTS

| | | | | |
|---|---|---|---|---|
| 2005/0138314 A1* | 6/2005 | Liang | .................. | G06F 12/1425 711/163 |
| 2009/0019256 A1* | 1/2009 | Kneebone | ............... | G06F 12/10 711/209 |
| 2009/0249352 A1* | 10/2009 | Hohensee | ............. | G06F 9/5088 718/105 |
| 2011/0214158 A1* | 9/2011 | Pasquero | ................ | G06F 21/35 726/2 |
| 2014/0136517 A1* | 5/2014 | Li | ......................... | G06F 16/345 707/722 |

OTHER PUBLICATIONS

Corbet, Counting on the time stamp counter, Nov. 13 2006, lwn.net.*

Andreas Schranzhofer, Jian-Jia Chen, and Lothar Thiele, "Timing Predictability on Multi-Processor Systems with Shared Ressources", Embedded Systems Week—Workshop on Reconciling Performance with Predictability, 2009, 6 pages.

Jan Nowotsch, Michael Paulitsch, Daniel Buehler, Henrik Theiling, Simon Wegener, and Michael Schmidt, "Monitoring-Based Resource Separation on Commercial Multi-core SoCs", draft paper distributed by Michael Schmidt on Aug. 10, 2012 on an e-mail list of the public-funded project "ARAMiS—Automotive, Railway and Avionics Multicore Systems" to participants from different companies. 10 pages.

* cited by examiner

SYSTEM ON CHIP AND METHOD OF EXECUTING A PROCESS IN A SYSTEM ON CHIP

FIELD OF THE INVENTION

This invention relates to a system on chip and to a method of executing a process in a system on chip.

BACKGROUND OF THE INVENTION

A system on chip (SoC) is a computer located on a single semi-conductor chip. A system on chip comprises a processing unit arranged to read executable instructions from a program memory unit and to execute them. A processing unit may comprise a single processor core or a group of two or more processor cores capable of operating in parallel. The program memory unit may be programmable or non-programmable or it may comprise programmable as well as non-programmable portions. A non-programmable instruction may be referred to as a hardcoded instruction. A program is a sequence of instructions written to perform a specified task on the system on chip. A process is an instance of a computer program that is being executed. A process may comprise one or more threads that execute instructions concurrently. Thus a computer program is a passive collection of instructions, whereas a process is the actual execution of those instructions.

A system on chip may further comprise a data memory unit for storing data other than instructions. The program memory unit and the data memory unit may be located within a single physical memory unit or may be considered one memory unit. A system on chip may further comprise a memory control unit (MCU) for allowing specific processes access to specific memory regions and for denying access to other processes.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
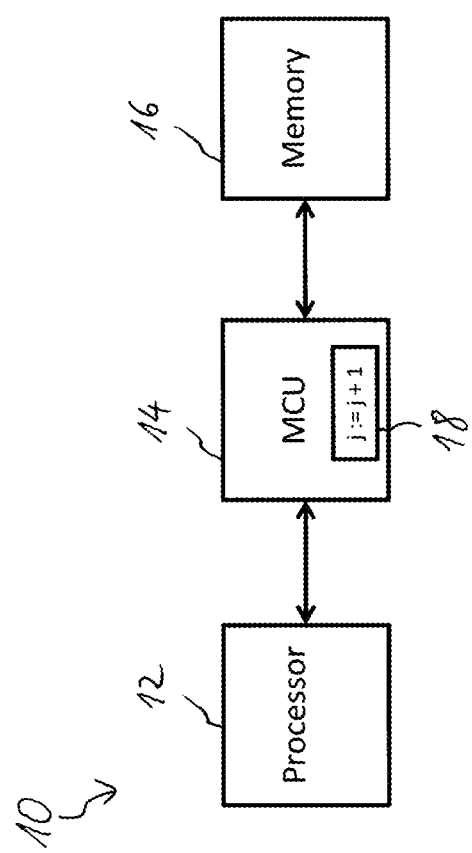
FIG. 1 schematically shows an example of an embodiment of a system on chip.

FIG. 1 schematically shows an example of a system on chip 10. The SoC 10 comprises a processing unit 12 for executing processes, a memory unit 16, and a memory control unit (MCU) 14 connected between the processing unit and the memory unit. The processing unit 12 may comprise one or more processor cores. The memory unit 16 may be a data memory unit. Alternatively, it may comprise a data memory unit and a program memory unit, wherein a program memory unit comprises executable instructions that may be read and executed by the processing unit 12.

The memory control unit 14 may be arranged to allocate a memory region to a process, for example, in response to an allocation request. The allocation request may be generated by, e.g., the process itself or, in an example in which the system on chip 10 comprises a dedicated task management unit (not shown), by the task management unit. The memory control unit 14 comprises a process activity counter 18 arranged to maintain a process activity count while the processing unit 12 is executing the process. The process activity count is a number of transactions by the process, or a duration of the process, e.g., since starting the process, or some other measure of activity of the process. In one example, the memory control unit 14 increments the process activity count with each clock cycle since, e.g., the beginning of the process and until, e.g., the process has ended. In a variant of this example, the memory control unit 14 increments the process activity count with each executed instruction of the process. A difference between these two schemes, i.e., between incrementing the process activity count with each clock cycle and incrementing the process activity count with each executed instruction of the process, may manifest itself, for example, when the process stalls, that is, when execution of the process is interrupted during one or more clock cycles. In yet another example, the memory control unit 14 increments the process activity count with each write transaction by the process to the memory unit 16, or with each read transaction to the memory unit 16, or with each transaction to the memory unit 16, be it a read transaction or a write transaction.

The memory control unit 14 may be arranged to monitor the process activity count and to disable the memory region allocated to the process when it detects that the process activity count exceeds a maximum process activity count. The maximum process activity count may be a parameter stored within the system on chip 10, e.g., inside the memory control unit 14. The maximum process activity count may be configurable by a user. For example, when a user installs a software application on the system on chip 10 for execution by the processing unit 12, the user may at the same time set the maximum process activity count for any future processes associated with the software application to a certain value. This value should be chosen sufficiently large so as to enable the process to terminate before the process activity count exceeds the maximum process activity count. In other words, the maximum process activity count should be chosen sufficiently large to insure that the actual process activity count of the process will not reach the maximum process activity count if the process behaves as expected. The maximum process activity count may, for example, be stored at a memory location which is not accessible by the processing unit or which is write-protected against the processing unit. The risk of an unintended or malicious modification of the maximum process activity count may thus be reduced.

The system on chip may have one, two, or more programs installed on it, and a maximum process activity count may be provided individually for each of these programs.

Disabling the memory region may include blocking the memory region against further transactions by the process and also against transactions by any other processes. The system on chip can thus be rendered less vulnerable to rogue processes. A rogue process is a process that does not behave as expected. Rogue processes may be caused by programming errors (bugs), or they may be the outcome of, e.g., malicious software that was installed intentionally or unintentionally on the system on chip 10.

Thus a method of limiting process access to memory regions to a maximum time and/or to a maximum number of accesses is provided. In one example, not only the region allocated to the process is disabled but a set of several regions is disabled when one of the regions in the set has its parameters violated.

It may be beneficial to implement the proposed scheme for disabling memory regions in hardware. It may thus be impossible for a potential hacker to bypass or to turn off the scheme.

In one example, optional parameters for a maximum or minimum process time and/or a maximum or minimum number of transactions to the memory unit 16 can be defined, for each memory region, e.g. during initialisation of the respective region. Hardware within the SoC may then use these parameters to ensure that only valid processes are given access to the respective memory region.

Specifying a maximum and a minimum valid time for a memory region can help to ensure that the process which is being executed remains within the bounds expected for the system. If, for example, the system was hacked and a rogue process is run, this limitation may limit the damage.

A timer may be implemented within, e.g., the memory control unit for measuring the duration of a given process. The timer may be arranged to start with, e.g., a first access by the process to the memory region.

For example, the memory control unit may comprise a timer for measuring a duration of the process. In one example, the timer is arranged to start from its reset state, i.e. T=0, in response to a first access by the process to the memory region. In another example the timer is arranged to start from its reset state upon launching the process, e.g., in response to executing a first instruction of the process. The memory control unit may be arranged to disable access to the region, for example, when the duration of the process as measured by the timer has exceeded a predefined time.

In addition to restricting access to the particular memory region under consideration so far, the memory control unit may be arranged to restrict access to other memory regions. These other memory regions may notably include memory regions not allocated to the process under consideration. Potential damage and further violations may thus be limited.

More generally, the memory control unit may be arranged to monitor a running process for security violations. Various events associated with the process may be considered security violations. A security violation may, for example, consist in the process ending before or after a predefined, e.g., programmed, minimum time or before or after a predefined number of transactions by the process. More generally, a security violation may be defined as the process behaving differently than expected. The memory control unit may therefore be arranged to provide one or more parameter describing expected characteristics of the process. These may be referred to as process parameters. The process parameters may be user-configurable. The process parameters may, for example, include one or more of the following: a minimum or maximum run time, a minimum or maximum number of executed instructions, a minimum or maximum number of transactions, for example, a minimum or maximum number of read transaction or a minimum or maximum number of write transactions by the process, and data generated by the process. For example, a program may be arranged to generate verification data for enabling a user or a monitoring unit to monitor, e.g., at regular or otherwise repeated intervals, whether an instance of the program, i.e., a process implemented by the program, is behaving as expected.

As mentioned above, the memory control unit may be arranged not only to disable access for the particular process for which a security violation was detected but to disable the memory region for any other processes. Disabling the memory region may include prohibiting write transactions or read transactions or both read and write transactions.

In one example, the monitoring unit may be arranged to track the number of transactions by a process separately for different types of accesses. For example, the monitoring unit may track the number of write transactions and, alternatively or additionally, the number of read transactions. This may be beneficial, for example, in an implementation in which the number of write transactions exceeding a certain limit is considered a security violation whereas the number of read transactions is not limited.

These features may be implemented, for example, using dedicated registers. These registers may, for example, include one or more registers for storing maximum or minimum time-out values, or maximum or minimum numbers of transactions, or both. If the memory control unit detects a security violation it may trigger an interrupt and may thus allow software, e.g., higher layer software, to evaluate the problem.

Figure 2:
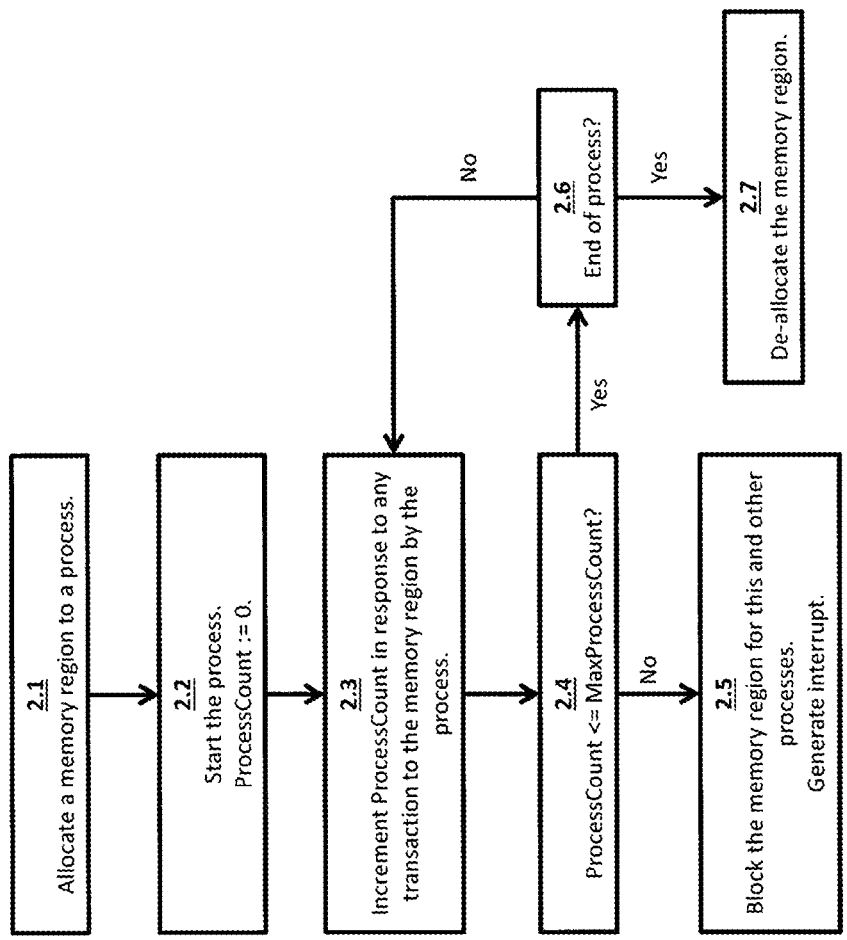
FIG. 2 shows a flow chart for illustrating an example of an embodiment of a method of operating a system on chip.

Referring now to FIG. 2, an example of an operating mode of a system on chip is described. The system on chip may, for example, be the system on chip 10 described above. Operation of the system on chip may comprise allocating a memory region to the process (box 2.1); starting the process (box 2.2) and, while the process is running (box 2.3), counting a duration of the process or counting transactions by the process to or from the memory region and maintaining a process activity count which represents the counted duration or the counted number of transactions; and disabling the memory region in response to the process activity count exceeding a maximum process activity count (box 2.5), wherein disabling the memory region includes blocking the memory region against further transactions by the process and against transactions by any other processes. In one example, any transactions by the process to or from the memory region are counted. In another example, only write transactions are counted. In yet another example, only read transactions are counted.

Operation of the system on chip may further include disabling the memory region in response to the process activity count failing to reach a minimum process activity count. Both the maximum process activity count and the minimum process activity count may be configurable by a user. For example, when the process has ended, the memory control unit 14 may determine whether the process activity count has reached the minimum process activity count, i.e., whether it is greater or equal to the minimum process activity count. When the process activity count has reached the minimum process activity count, no further action may be taken. If, however, the process activity count has not reached the minimum process activity count, the memory control unit 14 may disable the memory region against transactions by any other processes. Said other processes may include processes that are currently executing as well as processes which may execute later.

In one example the memory unit 14 disables the memory region along with one or more other memory regions in response to the process activity count exceeding a maximum process activity count, or, if a minimum process activity count is defined, in response to the process activity count failing to reach the minimum process activity count. For example, the memory control unit 14 may be arranged to disable the entire memory unit 16. Said other memory regions may notably include one or more memory regions which are not allocated to the process that prompts the memory control unit to disable these other memory regions.

Now referring more specifically to the flow chart in FIG. 2, a memory region may be allocated to a process (box 2.1). The process may be an instance of a program. The program may reside in a program memory unit of the system on chip. The allocated memory region may be a memory region in the program memory unit or a memory region in a data memory unit. The program memory unit and the data memory unit may be located within a common physical memory unit.

A processing unit may start executing the process (box 2.2). In other words, the process may start. A process activity count associated with the process may be set to an initial value, e.g., zero. The process activity count may be incremented in response to, e.g., any transaction to the memory region by the process or, as mentioned above, in response to certain types of transactions to the memory region by the process, e.g., only in response to write transactions or e.g. only in response to read transactions. In one example, separate process activity counts may be maintained for different types of transactions for the given process.

A monitoring unit, e.g., a monitoring unit integrated or provided by the memory control unit, may then check whether the process activity count is not greater than a maximum process activity count (box 2.4). If the process activity count is less than or equal to the maximum process activity count, the process flow may return to box 2.3. If, however, the process has ended (box 2.6), the memory region may be de-allocated from the process (box 2.7).

If, however, (again referring to box 2.4) the process activity count exceeds the maximum process activity count, the memory region may be blocked for both the running and other processes. An interrupt may then be generated. The interrupt may include executing an interrupt service routine. The interrupt service routine may be configurable by a user. The interrupt service routine may, for example, generate an error signal at one or more output ports of the system on chip, or stopping the system on chip, or turn it off. The system on chip can thus be made more robust against faulty or malicious processes.

In one example, the processing unit 12 is capable of running several processes simultaneously or quasi-simultaneously. Simultaneous execution means that an instruction of a first process and an instruction of a second process are executed at the same time, e.g., in the same clock cycle, using, for example, a multi-core processing unit. Quasi-simultaneous execution means that two or more processes are active or alive at the same moment. For example, the processing unit 12 may process several processes in a time-division multiplex scheme. E.g., it may execute one or more instructions of a first process in a first time slot, then execute one or more instructions of a second process in a second time slot, then execute one or more instructions of the first process in a third time slot.

The protection scheme described above, which is associated with a specific process, can be implemented separately for each among several processes which are being executed or which are scheduled to be executed simultaneously or quasi-simultaneously. For example, the memory control unit 14 may comprise a set of process activity counters, wherein each process activity counter 18 is associated with one of the multiple processes and arranged to count a duration of the respective process or to count transactions by the process to or from the memory region allocated to the respective process, and to maintain a process activity count representing the counted duration of the process or the counted transactions to or from the memory region. The memory control unit 14 may be arranged to disable, for each of the memory regions allocated to the multiple processes, the respective memory region in response to the respective process activity count exceeding a respective maximum process activity count, wherein disabling the memory region includes blocking the respective memory region against further transactions by the respective process and against transactions by any other processes.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the memory control unit 14 may be integrated in the processing unit 12 or in the memory unit 16.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on chip, comprising:
   a processing unit to execute processes;
   a memory unit; and
   a memory control unit connected between the processing unit and the memory unit the memory control unit to allocate a memory region to a process, the memory control unit includes:
      a process activity counter to count a duration of the process, and to maintain a process activity count representing the counted duration of the process, wherein the count of the duration of the process starts with an execution of a first instruction by the process, wherein the duration of the process is a length of time that the process has been executing instructions;
   wherein the memory control unit is arranged to disable the memory region in response to the process activity count exceeding a maximum process activity count, wherein the maximum process activity count is a predefined time that the process has been executing instructions, wherein disabling the memory region includes blocking the memory region against further transactions by the process and against transactions by any other processes.

2. The system on chip of claim 1, wherein the process activity counter is arranged to count each clock cycle of the process.

3. The system on chip of claim 1, wherein said memory region is a data memory region.

4. The system on chip of claim 1, wherein the maximum process activity count is user configurable.

5. The system on chip of claim 1, wherein the maximum process activity count is stored at a memory location that is not accessible by the processing unit or that is write-protected against the processing unit.

6. The system on chip of claim 1, wherein the control unit is arranged to disable the memory region in response to the process activity count failing to reach a minimum process activity count.

7. The system on chip of claim 1, wherein the processing unit comprises one or more processor cores.

8. The system on chip of claim 1, wherein the processing unit is capable of running multiple processes simultaneously or quasi-simultaneously;
   wherein the memory control unit is arranged to allocate a memory region to each process among multiple processes which are being executed or which are scheduled to be executed simultaneously or quasi-simultaneously;
   wherein the memory control unit comprises a set of process activity counters, wherein each process activity counter is associated with one of the multiple processes and arranged to count a duration of the respective process or to count transactions by the process to or from the memory region allocated to the respective process, and to maintain a process activity count representing the counted duration of the process or the counted transactions to or from the memory region; and
   wherein the memory control unit is arranged to disable, for each of the memory regions allocated to the multiple processes, the respective memory region in response to the respective process activity count exceeding a respective maximum process activity count, wherein disabling the memory region includes blocking the respective memory region against further transactions by the respective process and against transactions by any other processes.

9. The system on chip of claim 1, configured to provide one or more programs, wherein a maximum process activity count is provided individually for each program among two or more programs on the system on chip wherein all instances of any one of the programs have the same maximum process activity count.

10. The system on chip of claim 1, wherein the memory control unit is arranged to disable the memory region along with one or more other memory regions in response to the process activity count exceeding the maximum process activity count.

11. The system on chip of claim 10, wherein said one or more other memory regions are memory regions not allocated to the process.

12. The system on chip of claim 1, wherein transactions are allowed to other memory regions while the memory region is disabled in response to the memory control unit not restricting access to the other memory regions in response to the process activity count exceeding the maximum process activity count.

13. The method of claim 12, wherein the control unit is arranged to disable the memory region in response to the process activity count failing to reach a minimum process activity count.

14. The method of claim 12, wherein the maximum process activity count is stored at a memory location that is not accessible by the processing unit or that is write-protected against the processing unit.

15. The method of claim 12, wherein the memory control unit is arranged to disable the first memory region along with one or more other memory regions in response to the first process activity count exceeding the first maximum process activity count.

16. A method of executing a process in a system on chip, comprising:
   allocating a memory region to the process;
   starting the process and, while the process is running, counting a duration of the process, and maintaining a process activity count which represents the counted duration of the process, wherein the count of the duration of the process starts with an execution of a first instruction by the process, wherein the duration of the process is a length of time that the process has been executing instructions;

disabling the memory region in response to the process activity count exceeding a maximum process activity count, wherein the maximum process activity count is a predefined time that the process has been executing instructions, wherein disabling the memory region includes blocking the memory region against further transactions by the process and against transactions by any other processes.

17. The method of claim 16, wherein the maximum process activity count is stored at a memory location that is not accessible by the processing unit or that is write-protected against the processing unit.

18. The method of claim 16, wherein the control unit is arranged to disable the memory region in response to the process activity count failing to reach a minimum process activity count.

19. A method of executing processes in a system on chip, comprising:
   allocating a first memory region to a first process and a second memory region to a second process;
   starting the first and second processes;
   while the first process is running, counting a first duration of the first process, wherein a first count of the first duration of the first process starts with an execution of a first instruction by the first process, wherein the duration of the first process is a length of time that the first process has been executing instructions;
   maintaining a first process activity count which represents the first count of the first duration of the first process;
   disabling the first memory region for accesses in response to the first process activity count exceeding a first maximum process activity count, wherein the first maximum process activity count is a first predefined time that the first process has been executing instructions, wherein disabling the first memory region for accesses includes blocking access to the first memory region by the first process and by any other processes;
   while the second process is running, counting a second duration of the second process, wherein a second count of the second duration of the second process starts with an execution a first instruction by the second process, wherein the duration of the second process is a length of time that the second process has been executing instructions;
   maintaining a second process activity count which represents the second duration of the second process; and
   disabling the second memory region for accesses in response to the second process activity count exceeding a second maximum process activity count, wherein the second maximum process activity count is a second predefined time that the second process has been executing instructions, wherein disabling the second memory region for accesses includes blocking access to the second memory region by the second process and by any other processes.

\* \* \* \* \*